US008923400B1

(12) United States Patent
Alvarez et al.

(10) Patent No.: US 8,923,400 B1
(45) Date of Patent: Dec. 30, 2014

(54) METHOD AND/OR APPARATUS FOR MULTIPLE PASS DIGITAL IMAGE STABILIZATION

(75) Inventors: José R. Alvarez, Sunnyvale, CA (US); Guy Cote, San Jose, CA (US); Udit Budhia, Mountain View, CA (US)

(73) Assignee: Geo Semiconductor Inc, Santa Clara, CA (US)

( * ) Notice: Subject to any disclaimer, the term of this patent is extended or adjusted under 35 U.S.C. 154(b) by 1510 days.

(21) Appl. No.: 11/939,715

(22) Filed: Nov. 14, 2007

Related U.S. Application Data

(63) Continuation-in-part of application No. 11/675,715, filed on Feb. 16, 2007.

(51) Int. Cl.
*H04N 7/12* (2006.01)

(52) U.S. Cl.
USPC .................................. 375/240.16; 375/240.12

(58) Field of Classification Search
None
See application file for complete search history.

(56) References Cited

U.S. PATENT DOCUMENTS

| | | | |
|---|---|---|---|
| 5,999,651 A | 12/1999 | Chang et al. | |
| 6,084,912 A | 7/2000 | Reitmeier et al. | |
| 6,226,327 B1 * | 5/2001 | Igarashi et al. | 375/240.14 |
| 6,628,711 B1 * | 9/2003 | Mathew et al. | 375/240.12 |
| 6,809,758 B1 | 10/2004 | Jones | |
| 6,968,009 B1 | 11/2005 | Straasheijm | |
| 7,315,331 B2 * | 1/2008 | Franzen | 348/452 |
| 7,408,986 B2 | 8/2008 | Winder | |
| 7,755,667 B2 * | 7/2010 | Rabbani et al. | 348/208.6 |
| 8,149,911 B1 * | 4/2012 | Alvarez et al. | 375/240.12 |
| 2002/0118761 A1 | 8/2002 | Lee | |
| 2004/0091047 A1 * | 5/2004 | Paniconi et al. | 375/240.16 |
| 2004/0119887 A1 * | 6/2004 | Franzen | 348/459 |
| 2004/0120197 A1 | 6/2004 | Kondo et al. | |
| 2006/0017814 A1 | 1/2006 | Pinto | |
| 2006/0023790 A1 | 2/2006 | Tsai et al. | |
| 2006/0159311 A1 | 7/2006 | Bober | |
| 2006/0188021 A1 | 8/2006 | Suzuki et al. | |
| 2006/0206292 A1 | 9/2006 | Ali | |
| 2006/0228049 A1 | 10/2006 | Gensolen et al. | |
| 2006/0257042 A1 | 11/2006 | Ofek et al. | |
| 2006/0274156 A1 * | 12/2006 | Rabbani et al. | 348/208.99 |
| 2006/0290821 A1 | 12/2006 | Soupliotis et al. | |
| 2007/0076982 A1 * | 4/2007 | Petrescu | 382/294 |
| 2007/0092111 A1 | 4/2007 | Wittebrood et al. | |

(Continued)

OTHER PUBLICATIONS

Non-Final Office Action for U.S. Appl. No. 11/675,715, dated Jul. 22, 2011.

(Continued)

*Primary Examiner* — Hassan Phillips
*Assistant Examiner* — Mark A Mais
(74) *Attorney, Agent, or Firm* — Sughrue Mion, PLLC

(57) ABSTRACT

An apparatus including a first circuit and a second circuit. The first circuit may be configured to generate (i) a first series of sequential frames, (ii) a plurality of local motion vectors for each of the frames, (iii) one or more global motion vectors for each of the frames, (iv) a second series of stabilized sequential frames, (v) a plurality of rough motion vectors and (vi) a digital bitstream in response to (i) a video input signal. The second circuit may be configured to generate a single motion vector in response to a plurality of motion vectors. The second circuit may be further configured to eliminate outlier vectors from the plurality of motion vectors.

19 Claims, 8 Drawing Sheets

(56) References Cited

U.S. PATENT DOCUMENTS

| | | |
|---|---|---|
| 2007/0154066 A1 | 7/2007 | Lin et al. |
| 2007/0297513 A1* | 12/2007 | Biswas et al. ............ 375/240.16 |
| 2008/0004073 A1 | 1/2008 | John et al. |
| 2008/0030586 A1 | 2/2008 | Helbing et al. |

OTHER PUBLICATIONS

Dietmar Wueller, "Evaluating Digital Cameras", SPIE-IS&T/vol. 6069 60690K-1, 2006, 15 pages.

Kenya Uomori et al., "Automatic Image Stabilizing System by Full-Digital Signal Processing", IEEE Transactions on Consumer Electronics, vol. 36, No. 3, Aug. 1990, pp. 510-519.

Jie Shao et al., "Simultaneous Background and Foreground Modeling for Tracking in Surveillance Video", IEEE, 2004, pp. 1053-1056.

A.J. Crawford, et al., "Gradient Based Dominant Motion Estimation With Integral Projections for Real Time Video Stabilisation", IEEE, 2004, pp. 3371-3374.

Marius Tico et al., "Constraint Motion Filtering for Video Stabilization", IEEE, 2005, pp. III-569 through III-572.

Ikuko Tsubaki et al., "An Adaptive Video Stabilization Method for Reducing Visually Induced Motion Sickness", IEEE, 2005, pp. III-497 through III-500.

Filippo Vella et al., "Digital Image Stabilization by Adaptive Block Motion Vectors Filtering", IEEE Transactions on Consumer Electronics, vol. 48, No. 3, Aug. 2002, pp. 796-801.

Yu-Chun Peng et al., "Digital Image Stabilization and Its Integration With Video Encoder", IEEE, 2004, pp. 544-549.

Haruhisa Okuda et al., "Optimum Motion Estimation Algorithm for Fast and Robust Digital Image Stabilization", IEEE Transactions on Consumer Electronics, vol. 52, No. 1, Feb. 2006, pp. 276-280.

* cited by examiner

METHOD AND/OR APPARATUS FOR MULTIPLE PASS DIGITAL IMAGE STABILIZATION

This is a continuation-in-part of U.S. Ser. No. 11/675,715, filed Feb. 16, 2007 and is hereby incorporated by reference in its entirety.

FIELD OF THE INVENTION

The present invention relates to video processing generally and, more particularly, to a method and/or apparatus for implementing a multiple pass digital image stabilization system.

BACKGROUND OF THE INVENTION

As camcorders and other video recording devices (i.e., digital still cameras, mobile phones, etc.) continue to shrink in size, and as zoom ratios continue to increase, it becomes increasingly difficult for users to steadily hold a camera to produce stable video.

Camera ergonomics may not allow holding the device in a stable and comfortable position and thus promote unstable holding of the device. Also, because of the highly mobile nature of these devices, people are increasingly capturing video in less than ideal situations (i.e., outdoor activities, sporting events, etc.) as opposed to contrived in-door events. Therefore, there is less opportunity for properly supporting the camera during recording.

Furthermore, as optics continue to improve, magnification capabilities are often incorporated in such devices. High magnification factors (i.e., zooming) contribute to the unstable appearance of video since such zooming amplifies every small movement of the hand of the user.

Camera jitter (i.e., mechanical instability) introduces extraneous motion during video capture. The extraneous motion is not related to the actual motion of objects in the picture. Therefore, the motion appears as random picture movements that produce disturbing visual effects. The motion can be difficult to encode at low bit rates. The end result is video material that is hardly usable from both practical and aesthetic perspectives.

Camcorder manufacturers have implemented various ways of implementing image stabilization. One way is to use mechanical correction, including piezo-electric physical displacement, optical system fluid coupling/dampening and other mechanical dampening devices. Another way of solving the problem is by electronic correction (i.e., digital signal processing) using external sensors.

Current digital image stabilization solutions are limited by the type of processors used in typical cameras. These processors are more geared toward Image/Sensor Processing and therefore do not have easy access to the sophisticated motion estimation statistics commonly available in hybrid entropy video encoder/decoders (Codecs). Furthermore, in cases when a digital stabilization is used in the context of a video Codec, a large number of motion vectors are used in a single pass without a flexible selection of areas of motion and in a non-hierarchical motion estimation architecture.

It would be desirable to remove extraneous motion from an input video signal to produce a stabilized sequence of pictures that is more visually pleasing and/or more easily compressed.

SUMMARY OF THE INVENTION

The present invention concerns an apparatus including a first circuit and a second circuit. The first circuit may be configured to generate (i) a first series of sequential frames, (ii) a plurality of local motion vectors for each of the frames, (iii) one or more global motion vectors for each of the frames, (iv) a second series of stabilized sequential frames, (v) a plurality of rough motion vectors and (vi) a digital bitstream in response to (i) a video input signal. The second circuit may be configured to generate a single motion vector in response to a plurality of motion vectors. The second circuit may be further configured to eliminate outlier vectors from the plurality of motion vectors.

The objects, features and advantages of the present invention include providing a method and/or apparatus for implementing a digital image stabilization system that may (i) use available pre-processing structures (e.g., cropping, polyphase scaling, statistics gathering, feature classification regions, etc.), (ii) allow flexibility in using external overscan sensors such that the order of cropping and scaling during motion compensation may be reversed (or to allow scaling to be bypassed completely), (iii) implement a hierarchical motion estimation architecture that allows localized sets of motion vectors to be flexibly defined at any spatial location in a picture, (iv) implement pre-motion estimation that may be performed in the subsampled picture domain in order to increase motion detection range, (v) implement full-pel accurate motion vectors, (vi) achieve sub-pel global compensation through a scaling process, (vii) allow multiple pass analysis and detection of the image sequence to improve quality in an analogous manner as dual-pass rate control, (viii) reduce the data set of local motion vectors to simplify global motion vector computations, (ix) allow picture sequence adaptivity by analyzing statistical data gathered on both processing paths, (x) provide adaptivity that may be achieved for local motion as well as global motion by time-series processing of resulting stabilization data, (xi) allow encoding statistics to be used in determination of best quality in multiple encoding passes (e.g., does not preclude the use of multiple fast encodings and multiple stabilization enhancements) and/or (xii) provide stabilization by implementing multiple (e.g., recursive) processing passes.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention relates to providing a system that may be used to stabilize captured images in order to improve visual quality and/or the amount of compression. The present invention may use one or more digital image stabilization (DIS) techniques. In one example implementation, digital signal processing (DSP) may be used to estimate and compensate for random jitter introduced by the movement of a camera (or other capture device) during operation.

Figure 1:
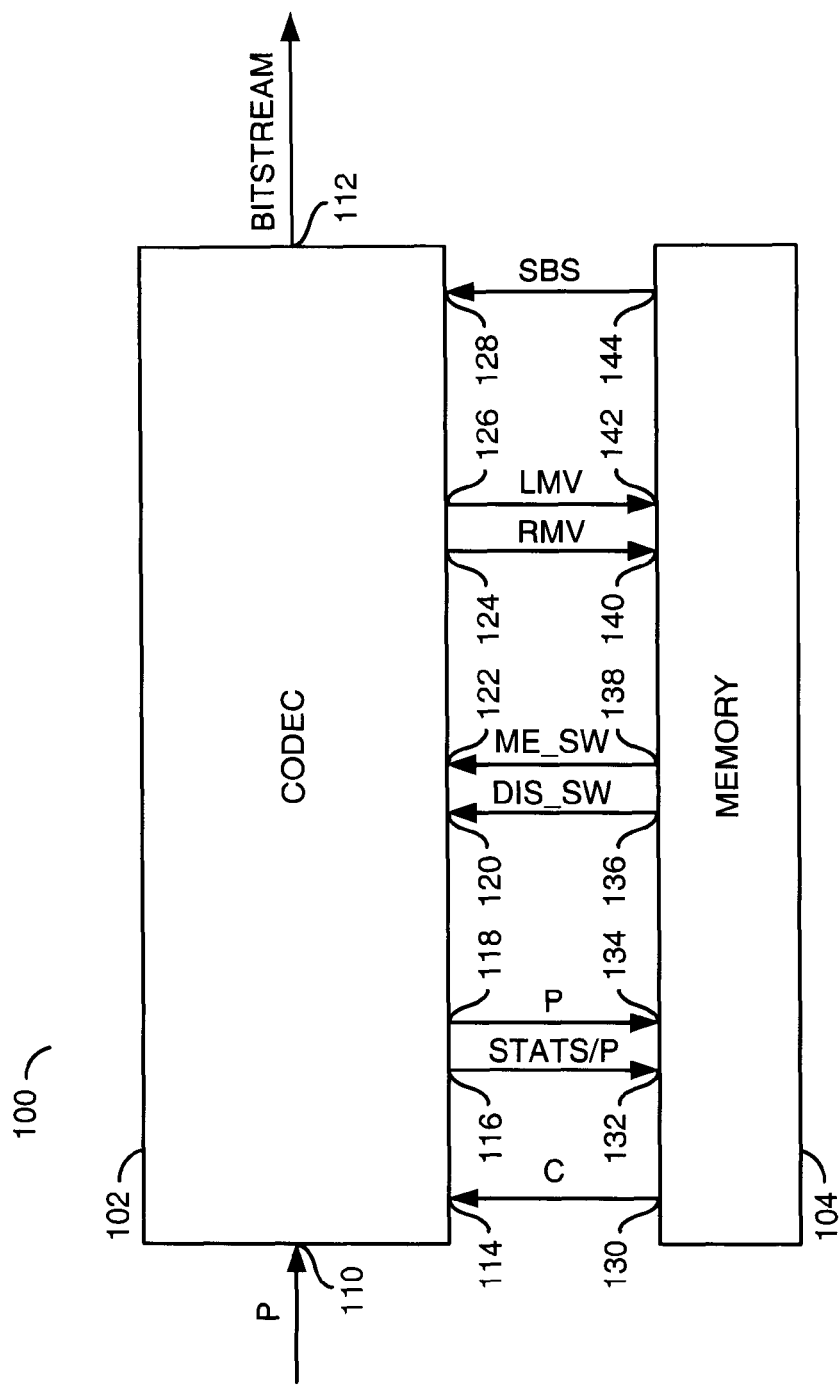
FIG. 1 is a block diagram illustrating a digital image stabilization (DIS) system in accordance with the present invention.

Referring to FIG. 1, a block diagram of a system 100 is shown illustrating a digital image stabilization (DIS) system in accordance with the present invention. The system 100 generally comprises a block (or circuit) 102 and a block (or circuit) 104. The block 102 may be implemented as a coder/decoder, or compressor/decompressor, (CODEC) circuit. The block 104 may be implemented as a storage device or medium (e.g., memory, etc.). In one example, the block 104 may be implemented as a random access memory (RAM). However, other types of memory (e.g., double data rate (DDR), synchronous dynamic random access memory (SDRAM), etc.) may be implemented accordingly to meet the design criteria of a particular implementation. The system 100 may be implemented in hardware, software or a combination of hardware and software according to the teachings of the present disclosure, as would be apparent to those skilled in the relevant art(s).

The block 102 may have an input 110 that may receive a signal (e.g., P) and an output 112 that may present a signal (e.g., BITSTREAM). The signal P generally represents an unencoded video input signal. In one example, the signal P may be received from an imaging sensor, or other capture device. The signal BITSTREAM generally represents an encoded digital bitstream. The signal BITSTREAM may be implemented, in one example, as a compressed bitstream. The signal BITSTREAM may be compliant with one or more standard or proprietary encoding/compression specifications.

In one example, the block 102 may have an input 114 that may receive a signal (e.g., C), an output 116 that may present a signal (e.g., STATS/P), an output 118 that may present the signal P, an input 120 that may receive a signal (e.g., DIS_SW), an input 122 that may receive a signal (e.g., ME_SW), an output 124 that may present a signal (e.g., RMV), an output 126 that may present a signal (e.g., LMV) and an input 128 that may receive a signal (e.g., SBS). In one example, the memory 104 may have an output 130 that may present the signal C, an input 132 that may receive the signal STATS/P, an input 134 that may receive the signal P, an output 136 that may present the signal DIS_SW, an output 138 that may present the signal ME_SW, an input 140 that may receive the signal RMV, an input 142 that may receive the signal LMV and an output 144 that may present the signal SBS. The signal C may comprise one or more cropped images (or pictures). The signal STATS/P may comprise stabilized picture and statistics information. The signal P may comprise unstable (e.g., jittery) input video information. The video information in the signal P may be full resolution (e.g., capture resolution). The signal DIS_SW may comprise search window information (e.g., location, search ranges, number of search areas and any other parameters specified by the digital image stabilization technique implemented by the circuit 102). The signal ME_SW may comprise information that may be used in performing a motion estimation process compliant with an encoding process implemented by the circuit 102. The signal RMV may comprise rough motion vector information. The signal LMV may comprise local motion vector information. The signal SBS may comprise stabilized picture and statistics information that may be used by the encoding process implemented by the circuit 102.

The inputs, outputs and signals shown coupling the block 102 and the block 104 generally represent logical inputs, logical outputs and logical data flows. The logical data flows are generally illustrated as signals communicated between respective the inputs and outputs for clarity. As would be apparent to those skilled in the relevant art(s), the inputs, outputs, and signals illustrated in FIG. 1 (and also in FIG. 2) representing the logical data flows are generally representative of physical data transferred between the respective blocks by, for example, address, data, and control signals and/or busses. Although the logical data flows are shown together for completeness, as would be apparent to those skilled in the relevant art(s) individual data flows may occur simultaneously or separately from one another depending upon the design criteria of a particular implementation.

Figure 2:
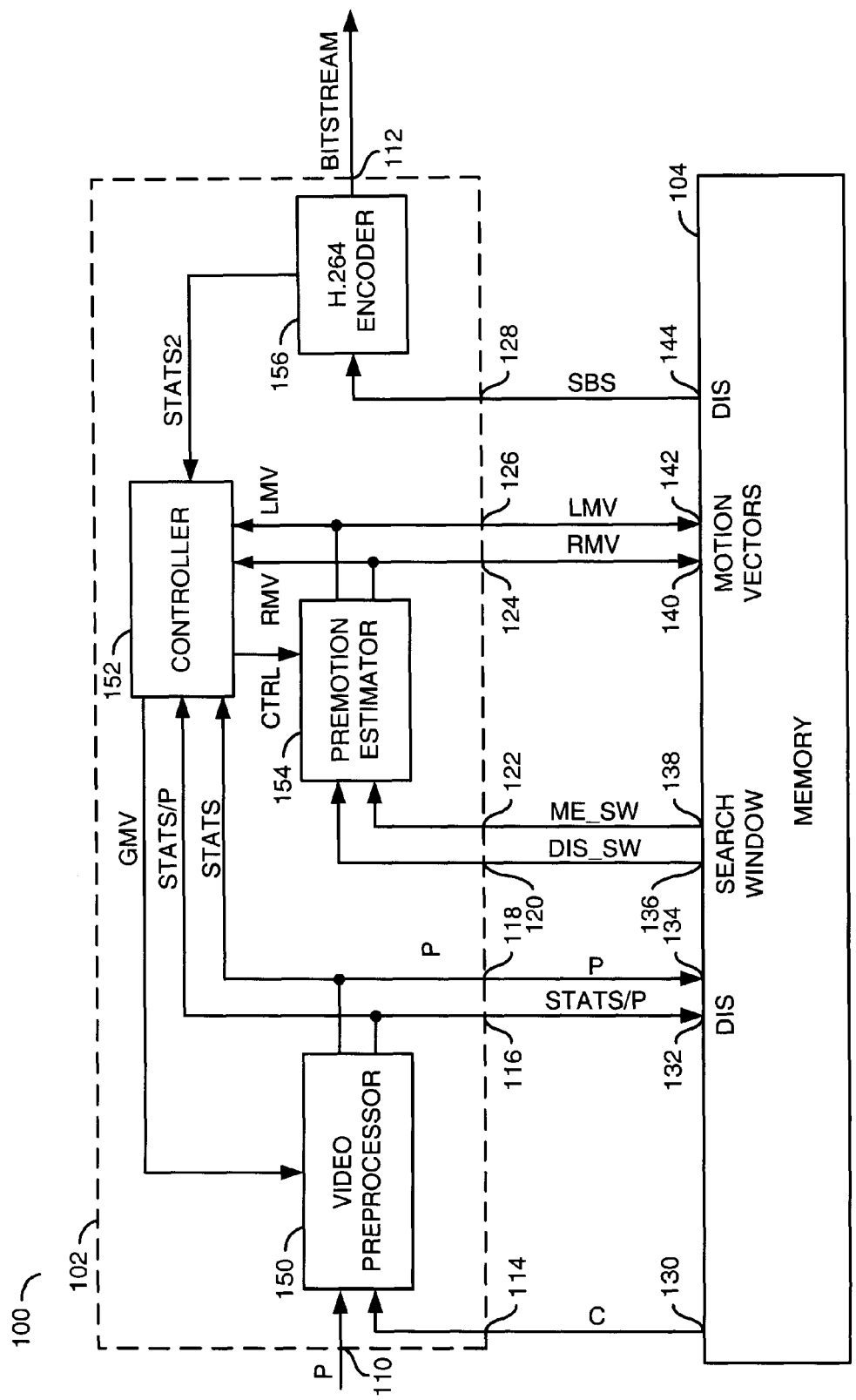
FIG. 2 is a more detailed diagram illustrating an implementation of the digital image stabilization (DIS) system of FIG. 1 in accordance with a preferred embodiment of the present invention.

Referring to FIG. 2, a diagram is shown illustrating an example implementation of the system 100 in accordance with a preferred embodiment of the present invention. The circuit 102 may comprise a block (or circuit) 150, a block (or circuit) 152, a block (or circuit) 154 and a block (or circuit) 156. The circuit 150 may be implemented as a video preprocessor circuit. The circuit 152 may be implemented as a controller circuit. The circuit 154 may be implemented as a premotion estimator circuit. The circuit 156 may be implemented, in one example, as an H.264 encoder circuit. However, other encoders may be implemented to meet the design criteria of a particular implementation. Although the circuit 156 is shown integrated with the circuit 102, the circuit 156 may be implemented separately from the circuit 102.

The circuit 150 may receive a signal (e.g., GMV), the signal P and the signal C. The circuit 150 may generate a signal (e.g., STATS), the signal P and the signal STATS/P in response to the signals GMV, P and C. The circuit 152 may receive a signal (e.g., STATS2) and the signals STATS, STATS/P, RMV and LMV. The circuit 152 may generate a signal (e.g. CTRL) and the signal GMV in response to the signals STATS, STATS2, STATS/P, RMV and LMV. The circuit 154 may receive the signals CTRL, DIS_SW and ME_SW. The circuit 154 may generate the signals RMV and LMV in response to the signals CTRL, DIS_SW and ME_SW. The circuit 156 may receive the signal SBS. The circuit 156 may generate the signal BITSTREAM and the signal STATS2 in response to the signal SBS.

The system 100 may process the input video data signal P in two stages. The unstable (jittery) input video signal P may be passed through the video preprocessor circuit 150 at full resolution to capture the signal P as a sequence of video pictures. The video preprocessor circuit 150 may generate statistics for the unstable input video signal P that may be communicated (e.g., via the signal STATS) to the controller 152 for analysis. The analysis may include, for example, scene detection and sudden event detection. Pictures containing unstable portions of the input video signal P may be stored in the memory 104 (e.g., via the signal P) for further processing.

The premotion estimator circuit 154 may receive the location, search ranges, number of areas and other parameters from the memory 104 (e.g., via the signal DIS_SW) and the controller 152 (e.g., via the signal CTRL) based on indications (or instructions) from firmware (or software) executed by the controller 152. The premotion estimator circuit 154 may use the location, search ranges, number of areas and other parameters indicated by the firmware executed by the controller 152 to compute and transmit raw local motion vectors. The raw local motion vectors may be computed for a specific block or set of blocks in the picture being processed. The raw local motion vectors may be presented to the memory 104 and the controller 152 via the signal LMV. Further processing of the raw local motion vectors may produce the GMV that eventually is used to compensate (stabilize) the picture.

The controller 152 analyses the signal STATS and the local motion vectors (LMVs) for a respective picture to produce a global motion vector (GMV) and other control information for motion compensation (stabilization) of the respective picture. The video preprocessor 150 receives the global motion vector and other control information for motion compensation (stabilization) of the respective picture via the signal GMV and retrieves one or more cropped pictures from a displaced location in the memory 104. The displaced location for retrieving the cropped picture(s) is generally indicated by the global motion vector(s) received from the controller 152. In one example, the video preprocessor circuit 150 may perform scaling with sub-phase accuracy (e.g., using a multiple phase scaler) to produce a sub-pel displacement (stabilization). The video preprocessor circuit 150 writes the stabilized picture(s) and statistics to the memory 104 and the controller 152 (e.g., via the signal STATS/P).

The premotion estimator circuit 154 retrieves information from the memory 104 (e.g., via the signal ME_SW) for performing a pre-motion estimation process. The pre-motion estimation process may be performed in the normal hierarchical motion estimation process which is normally part of the encoder process (e.g., H.264, etc.) implemented by the system 100. The premotion estimator circuit 154 writes search area rough motion vectors (RMV) to the memory 104 and the controller 152 (e.g., via the signal RMV). The rough motion vectors may be used by the encoder 156 for further motion estimation refinement.

The encoder 156 uses the stabilized picture and statistics information retrieved from the memory 104 (e.g., via the signal SBS) to code pictures with the best quality. The encoder 156 produces encoded bitrate and compression statistics that are communicated to the controller 152 (e.g., via the signal STATS2). The encoded bitrate and compression statistics may be used for further refinements to the digital image stabilization process.

The system 100 may provide digital image stabilization (DIS) using digital information extracted from the input video signal P. The system 100 may perform sub-pel accurate DIS through the video preprocessor circuit 150, the premotion estimator circuit 152 and a method (or process) running on the controller 152. The controller 152 may be implemented as a programmable processor. The system 100 may generate a global motion vector (GMV) for each picture obtained through the stabilization process. In one example, the digital stabilization process may be implemented in software or firmware. For example, the digital stabilization process may be implemented and/or controlled using computer executable instructions stored in a computer readable medium.

The video preprocessor circuit 150 and the premotion estimator circuit 154 may be used during encoding operations. The video preprocessor circuit 150 and the premotion estimator circuit 154 may also be used in parallel under firmware control to compute the global motion vectors (e.g., vectors 210a-210n in FIG. 7) and/or to perform global image displacement for improved coding.

The actual global displacement indicated by the global motion vector GMV may use sub-pel accuracy. In order to perform sub-pel accurate displacement two mechanisms may be implemented. The first one comprises reading an offset location from memory. For example, if the original picture is stored at location x,y in the memory 104, a GMV (global motion vector) may be generated that indicates the image should be read from location (x+n, y+m), where the n,m value is the two-dimensional displacement. If the actual displacement computed turns out to be a fractional number (e.g., a non-integer pixel displacement) the non-integer part of the displacement may be computed by interpolation using a polyphase filter.

Figure 3:
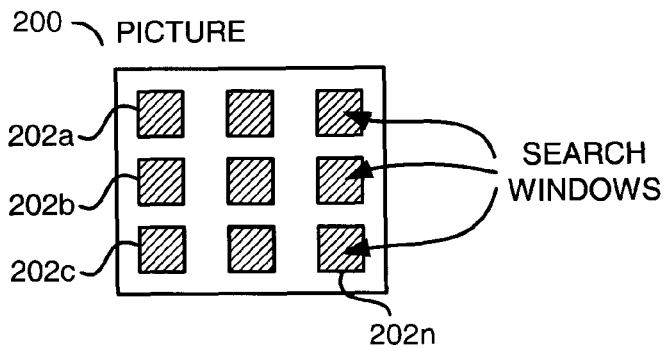
FIG. 3 is a diagram illustrating partitioning of an image.

Referring to FIG. 3, a diagram is shown illustrating partitioning of an image 200 into a number of search windows. The image 200 may be one frame generated from the input signal P. A number of search windows 202a-202n may be defined in the frame 200. Each of the search windows 202a-202n may be separately analyzed (e.g., as described below in connection with FIGS. 4 and 5). FIG. 3 generally illustrates an implementation with nine search windows 202a-202n. However, the particular number of search windows in each picture 200 may be varied to meet the design criteria of a particular implementation. The number and/or position of each of the search windows 202a-202n may be varied to meet the design criteria of a particular implementation. In one example, the number and/or position of each of the search windows 202a-202n may be varied dynamically. The number and/or position of each of the search windows 202a-202n may be programmable.

Figure 4:
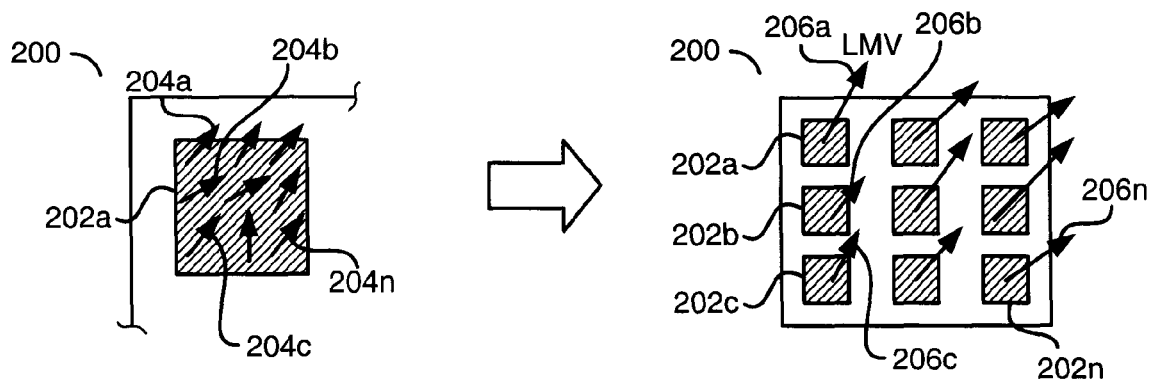
FIG. 4 is a diagram illustrating computation of local motion vectors.

Referring to FIG. 4, a diagram is shown illustrating computation of local motion vectors for the search windows 202a-202n of FIG. 3. The premotion estimation circuit 154 computes a local motion vector (e.g., LMV) for each of the search windows 202a-202n based upon a cluster of motion vectors 204a-204n for each of the search windows 202a-202n. Each search window 202a-202n generally has a corresponding local motion vector 206a-206n. The premotion estimation circuit 154 generally searches the particular search window 202a-202n in a previous picture to find the best match. The computation may use information that is part of the normal motion estimation process in a typical encoder data path.

Each local motion vector (LMV) 206a-206n may be the result of the plurality of motion vectors 204a-204n derived from adjacent blocks (e.g., macroblocks) in the respective search windows 202a-202n. In one example, a single LMV 206 may be derived for each local cluster of motion vectors 204a-204n. The single LMV 206 may be used for further processing. In a preferred embodiment, a recursive method may be used to derive the local and global vectors (described below in connection with FIGS. 9-11).

Figure 5:
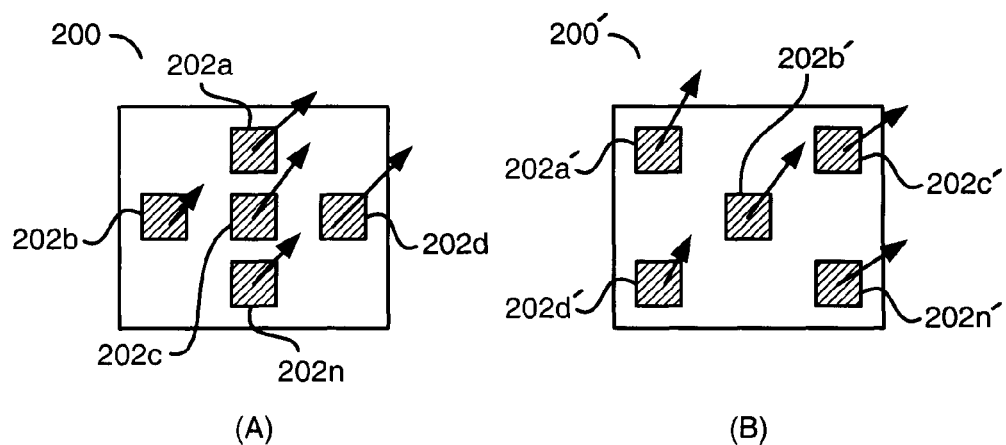
FIGS. 5(A-B) are diagrams illustrating manipulation of search windows.

Referring to FIGS. 5(A-B), diagrams are shown illustrating an example manipulation of the search windows 202a-202n. The number, location and size of the search windows 202a-202n in each picture may be changed according to particular criteria determined by the stabilization process implemented in the system 100. The criteria may include, but are not limited to, (i) statistical analysis using video preprocessor (VPP) data (e.g., motion in static areas, high frequency content, etc.), (ii) clustering of pre-motion vectors using pre-motion estimation results, and/or (iii) fidelity of encoding using encoder statistics. In one example, the number of search windows 202a-202n may be located according to a first layout (FIG. 5A). In another example, a number of search windows 202a'-202n' may be located according to a second layout (e.g., the picture 200' in FIG. 5B). The particular grouping of the search windows 202a-202n and/or 202a'-202n' may be varied to meet the design criteria of a particular implementation.

Figure 6:
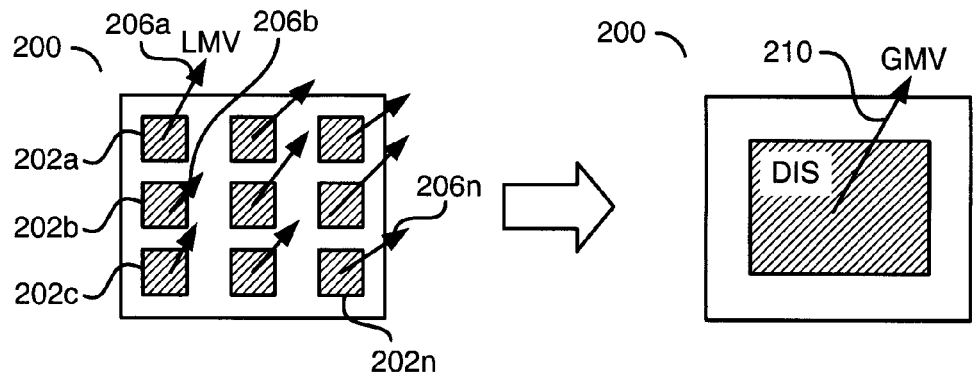
FIG. 6 is a diagram illustrating generation of a global motion vector.

Referring to FIG. 6, a diagram illustrating a global motion vector (GMV) 210 is shown. In general, as each picture 200 in a particular sequence of pictures is stabilized, a respective global motion vector 210 may be generated using the plurality of local motion vectors 206a-206n for the picture 200. In general, one global motion vector 210 is generated for each picture 200. A sequence of GMVs is thus obtained for the pictures in the particular sequence of pictures.

Figure 7:
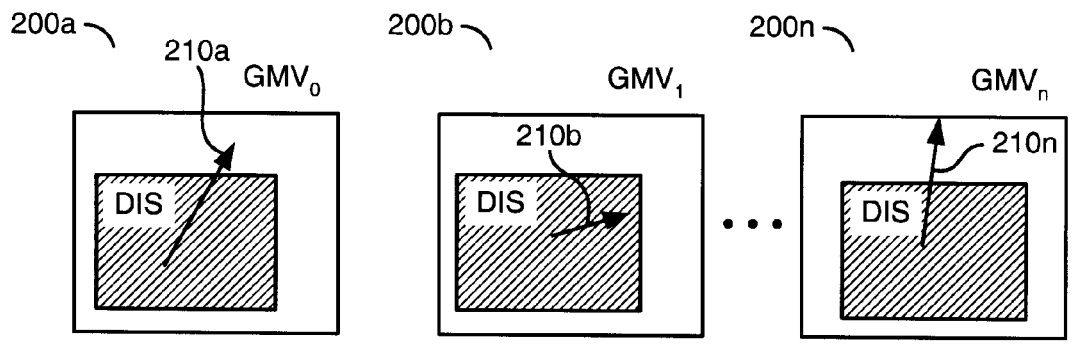
FIG. 7 is a diagram illustrating the global motion vectors from a series of pictures.

Referring to FIG. 7, a diagram is shown illustrating changes in a number of global motion vectors 210a-210n over time. A video sequence containing a number of pictures 200a-200n is shown. For every picture 200a-200n in the video sequence, a succession of global motion vectors (GMVs) 210a-210n is generated in response to the corresponding set of local motion vectors 206a-206n generated for each of the pictures 200a-200n. The GMVs 210a-210n may be processed temporally to produce a single global motion compensated shift (transition) for each picture, therefore, stabilizing the original pictures. In one example, each picture may be compensated using a combination of offset reads from memory and sub-phase interpolation (e.g., using internal scaler modules of the video preprocessor circuit 150).

Figure 8:
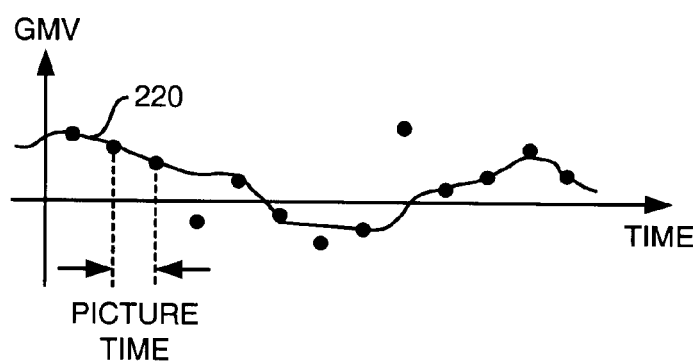
FIG. 8 is a graph illustrating changes in global motion vectors over time.

Referring to FIG. 8, a plot of the computed global motion vectors 210a-210n is shown represented as a time-series for one dimension of each vector. The system 100 may provide temporal processing of motion vectors. For example, the system 100 may smooth out irregularities in the series of global motion vectors 210a-210n to produce stable pictures over time. In one example, a curve fitting process may be used to smooth out the irregularities. For example, a line 220 generally represents an example of a fitted curve for the global motion vectors 210a-210n. In one embodiment, the present invention generally provides a running average of the global motion vectors of, for example, fifteen consecutive pictures.

In one example, the motion vectors may be processed in such a way as to remove DC components. The AC (varying) components of the global motion vectors may be used to determine the motion shift used to compensate for shaking of the pictures. The system 100 may be used to perform temporal processing, smoothing and prediction through median filtering, clustering, and/or averaging. In addition, a kalman filter predictor may be incorporated as part of the temporal filtering to further stabilize the results.

For example, N processed GMVs 210a-210n may be gathered (e.g., one for each picture 200a-200n). A temporal filtering operation may be performed on the N consecutive GMVs. In one example, the temporal filtering may comprise a temporal averaging of the samples. The value resulting from the temporal averaging constitutes a DC component for the set of N samples. The DC value is removed from the current GMV in proportion using a simple predictor (e.g., convex operation as indicated below, or a kalman filter). In a preferred embodiment a running sum (e.g., accumulator Acc(t)) of the motion vectors may be maintained as each vector is obtained. Maintaining the running sum is equivalent to performing a translational shift with respect to the first frame in the sequence of N samples.

In one example, the convex operation may be implemented according to the following Equation 1:

$$DC(t) = ((1-\text{alpha})*DC(t-1)) + (\text{alpha}*Acc(t)) \quad \text{Eq. 1.}$$

A final displacement for time 't' may be expressed by the following Equation 2:

$$GMV\_shift(t) = GMV(t) - DC(t), \quad \text{Eq. 2}$$

where GMV_shift(t) is the actual value used to compensate the picture for stabilization. The goal is that the final shift used to globally compensate for 'shaking' be of zero mean over a period of time.

Figure 9:
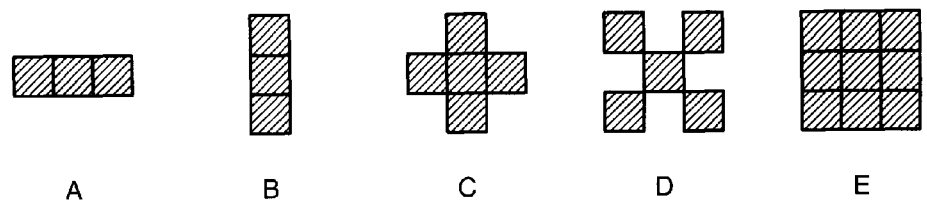
FIGS. 9(A-E) are diagrams illustrating example macroblock arrangements for generating motion vector clusters corresponding to a search window.

Referring to FIGS. 9(A-E), diagrams are shown illustrating example macroblock clusters that may be used to generating a plurality of motion vectors in each search window. A small neighborhood of blocks in a particular location of the picture may be selected. The small neighborhood is generally chosen as adjacent blocks. In one example, a row (FIG. 9A) or column (FIG. 9B) of three blocks may be chosen. In another example, five blocks may be chosen where the blocks are arranged in a '+' pattern (FIG. 9C) or an 'x' pattern (FIG. 9D). In a preferred embodiment, 9 adjacent blocks are chosen. However, other configurations may be implemented to meet the design criteria of a particular implementation. The pre-motion estimator circuit 154 performs motion estimation for each of the neighboring blocks to obtain one motion vector (MV) for each block (e.g., the motion vectors 204a-204n discussed above in connection with FIG. 4).

The present invention may repurpose pre-motion estimation (PME), designed for performing motion estimation to generate rough motion vectors for use in encoding video, to performing digital image stabilization. In one example, block based motion estimation for 8×8 size macroblocks may be performed using a PME module implemented in hardware. Performing PME for all possible 8×8 macroblocks in a picture may not necessarily improve the performance of image stabilization. Instead, PME may be performed from a selected number of macroblocks in a picture.

The reliability of the motion vectors for the purpose of image stabilization generally depends upon the selection of the macroblocks for PME. Ideally, search windows should be placed in areas of the picture where there is no local motion and having low frequency content. In one example, the PME search windows may be defined for fixed location in the picture. For example, each search window may be equally spaced from one another. Each search window may contain a cluster of nine macroblocks. In each of the search windows the motion vectors for an 8×8 macroblock and neighboring macroblocks may be determined. In one example, the cluster arrangements as illustrated in FIGS. 9(A-E) may be used.

The motion vectors produced may be processed in hardware, firmware or software to obtain local and/or global motion vectors. The choice of search window may significantly affect image stabilization effectiveness. The PME vectors may be unreliable if the macroblock has very low frequency content and belongs to a region of localized motion. In one example, the search windows may be chosen based upon statistics from the video preprocessor circuit 150 (e.g., by identifying areas of specific frequency and edge content).

In one example a horizontal search range of ±40 may be used for standard definition (SD) sequences. A vertical search range may be set to ±30. The vertical search range is generally smaller than the horizontal search range. For example, panning generally takes place in the horizontal direction. In one example, a lambda value of sixteen may used for the vertical and horizontal directions. Using a lambda value that is too low may lead to uncorrelated motion vectors that may yield a false global motion vector for compensation. PME may be performed on un-decimated video frames for SD sequences and on decimated video for high-definition (HD) sequences. The search range for image stabilization may be adjusted based upon availability of computing resources (e.g., bandwidth, cycles, memory, etc.). The motion estimation for PME may be started at the location of the collocated macroblock in a previous frame. The motion estimation may be performed around the zero motion vector rather than around the predicted motion vector.

In one example, digital image stabilization for HD sequences may be performed by determining PME vectors on a 4:1 down-scaled image. The motion vectors may be scaled accordingly when performing global motion compensation to find the offsets in the picture. The choice of lambda and search range in the horizontal and vertical directions may be optimized using Nedler Search optimization techniques.

Figure 10:
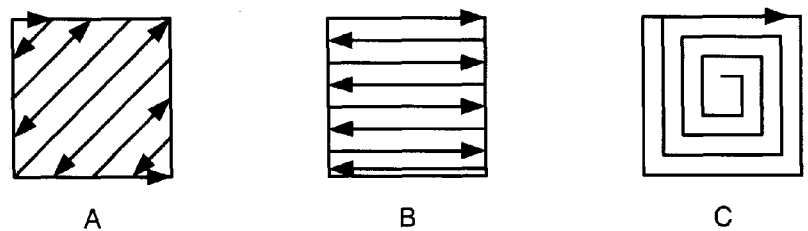
FIGS. 10(A-C) are diagrams illustrating motion vector arrangements for generating a local motion vector corresponding to a search window.

Referring to FIGS. 10(A-C), diagrams are shown illustrating motion vector arrangements that may be used to generate a local motion vector 206 from the plurality of motion vectors 204a-204n. In general, the MVs 204a-204n may be ordered in an arrangement that reduces the entropy between the MVs. In a preferred embodiment, a zig-zag pattern (FIG. 10A) starting at an upper-left corner of the neighborhood and ending in a lower-right corner of the neighborhood may be implemented. The end of the pattern may be wrapped around to the beginning to provide a contiguous set (e.g., a circular buffer) to avoid edge effects in further filtering. However, other configurations such as a reversible scan (FIG. 10B) and a spiral scan (FIG. 10C) may be used.

Due to random motion in the search window or errors in estimation, there may be block vectors that do not correlate well with their neighbors within the search window. The motion vectors that do not correlate well other vectors within the search window may be referred to as outliers (or outlier vectors). The outliers are identified and eliminated from the cluster of motion vectors in order to have a more accurate derivation of the localized motion vector. Techniques for removing the outliers are discussed below in connection with FIGS. 11-14.

Figure 11:
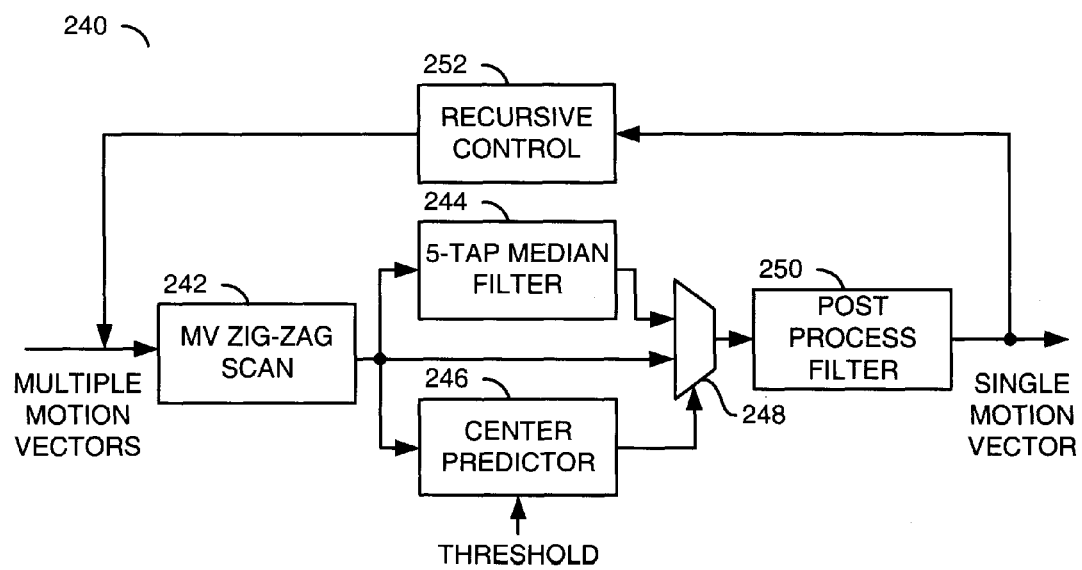
FIG. 11 is a block diagram illustrating a process in accordance with an embodiment of the present invention for generating a local motion vector.

Referring to FIG. 11, a block diagram is shown illustrating a process (or circuit) 240 in accordance with a preferred embodiment of the present invention. The process 240 may be implemented to generate a single motion vector based on multiple motion vectors. In one example, the process 240 may be used to generate a local motion vector (LMV) 206 from a plurality of motion vectors 204a-204n. In another example, the process 240 may be used to generate a global motion vector (GMV) 210 from a plurality of local motion vectors 206a-206n.

The process 240 may comprise a process (or circuit) 242, a process (or circuit) 244, a process (or circuit) 246, a process (or circuit) 248, a process (or circuit) 250 and a process (or circuit) 252. The process 242 may be implemented as a motion vector scanning process. The process 242 may arrange multiple motion vectors by performing a serialization scan (e.g., zig-zag, reversible, spiral, etc.). The process 244 may be implemented as a median filter process. In one example, the process 244 may be implemented as a 5-tap median filter. However, other numbers of taps (e.g., 3, etc.) may be implemented accordingly to meet the design criteria of a particular implementation. The process 246 may be implemented as a center predictor process. The process 248 may be implemented as a multiplexing process. The process 250 may be implemented as a post process filter process. The process 250 generally converts a cluster of motion vectors into a single motion vector. In one example, the conversion may include a linear combination of the motion vectors. In a preferred embodiment, the linear combination may be implemented as an averaging operation of the motion vectors. The process 252 may be implemented as a recursive control process.

The process 242 may receive multiple motion vectors of full-pel or greater (e.g., sub-pel such as half-pel, quarter-pel, eighth-pel, etc.) accuracy. The process 242 may present the motion vectors to an input of the process 244, a first input of the process 246 and a first input of the process 248 in an order that reduces entropy between the multiple motion vectors. The process 244 performs a median filtering operation on the ordered MVs and presents the result to a second input of the process 248. In a preferred embodiment the process 244 uses a 5-tap median filter.

The process 246 receives a threshold value (e.g., THRESHOLD) at a second input and generates a control signal in response to the ordered MVs and the threshold value. The process 246 presents the control signal to a control input of the process 248. The process 248 selects either the output from the process 244 or the ordered MVs from the process 242 for presentation to an input of the process 250 in response to the control signal received from the process 246.

The process 250 performs a post process filtering operation on the output of the process 248. In one example, the post process filtering operation may comprise performing an averaging filter on the MVs received from the process 248. In one example, the average filter may be performed independently for horizontal and vertical components. In another example, the post process filtering operation may be implemented as a median filter or ordered filter. When the multiple motion vectors received by the process 242 comprise motion vectors for a cluster, the process 250 presents a single average MV for the entire cluster (e.g., a local motion vector (LMV) 206). The single average MV generated by the process 250 is presented to an input of the process 252.

When all of the LMVs for each chosen location (e.g., search window) in the picture are obtained, the multiple LMVs may be presented to the input of the process 242 and the process 240 may be performed on the LMVs to generate a global motion vector (GMV) 210 (e.g., a recursive step). The LMVs and GMVs generated by the process 240 may be generated with sub-pel accuracy, even when the input motion vectors presented to the process 242 have only full-pel accuracy. In a preferred embodiment, only full-pel accurate motion vectors are used for generation of LMVs and GMVs in order to reduce computational demands. In general, both local and rough motion vectors may be sub-pel or full-pel accurate, depending upon the design criteria of a particular implementation. The best choice for quality is sub-pel accuracy, because sub-pel accuracy means the reach of the motion vector is between pixels, and therefore more accurate. The best choice for power utilization/processing time is full-pel accuracy, because there are fewer samples to process.

Figure 12:
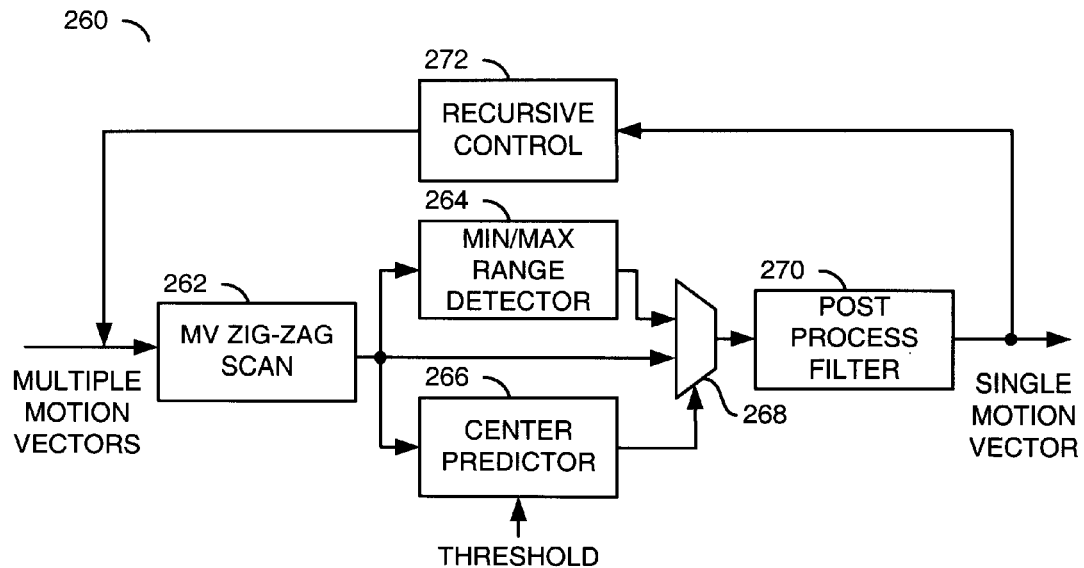
FIG. 12 is a block diagram illustrating a process in accordance with another embodiment of the present invention for generating a local motion vector.

Referring to FIG. 12, a block diagram is shown illustrating a process (or circuit) 260 in accordance with a preferred embodiment of the present invention. The process 260 may be implemented to generate a single motion vector based on multiple motion vectors. In one example, the process 260 may be used to generate a local motion vector (LMV) 206 from a plurality of motion vectors 204a-204n. In another example, the process 260 may be used to generate a global motion vector (GMV) 210 from a plurality of local motion vectors 206a-206n.

The process 260 may comprise a process (or circuit) 262, a process (or circuit) 264, a process (or circuit) 266, a process (or circuit) 268, a process (or circuit) 270 and a process (or circuit) 272. The process 262 may be implemented as a motion vector scanning process. The process 262 may arrange multiple motion vectors by performing a serialization scan (e.g., zig-zag, reversible, spiral, etc.). The process 264 may be implemented as a range detection process. In one example, the process 264 may be implemented as a minimum/maximum range detector. The process 266 may be implemented as a center predictor process. The process 268 may be implemented as a multiplexing process. The process 270 may be implemented as a post process filter process. The process 270 generally converts a cluster of motion vectors into a single motion vector. In one example, the conversion may include a linear combination of the motion vectors. In a preferred embodiment, the linear combination may be implemented as an averaging operation of the motion vectors. The process 272 may be implemented as a recursive control process.

The process 262 may receive multiple motion vectors of full-pel or greater (e.g., sub-pel such as half-pel, quarter-pel, eighth-pel, etc.) accuracy. The process 262 may present the motion vectors to an input of the process 264, a first input of the process 266 and a first input of the process 268 in an order that reduces entropy between the multiple motion vectors. The process 264 performs a range detection operation on the ordered MVs and presents the result to a second input of the process 268. In a preferred embodiment the process 264 uses a minimum/maximum range detector. In one example, the motion vectors corresponding to an N×N grid of macroblocks in the search area may be arranged in order of magnitude. The outliers may be determined, in one example, as those vectors having values below a first (or minimum) threshold value (e.g., the $20^{th}$ percentile) and above a second (or maximum) threshold value (e.g., the $80^{th}$ percentile). The cluster of vectors to be further processed are the remaining vectors after elimination of the outliers based upon the predetermined criteria.

The process 266 receives a threshold value (e.g., THRESHOLD) at a second input and generates a control signal in response to the ordered MVs and the threshold value THRESHOLD. The process 266 presents the control signal to a control input of the process 268. The process 268 selects either the output from the process 264 or the ordered MVs from the process 262 for presentation to an input of the process 270 in response to the control signal received from the process 266.

The process 270 performs a post process filtering operation on the output of the process 268. In one example, the post process filtering operation may comprise performing an averaging filter on the MVs received from the process 268. In one example, the average filter may be performed independently for horizontal and vertical components. In another example, the post process filtering operation may be implemented as a median filter or ordered filter. When the multiple motion vectors received by the process 262 comprise motion vectors for a cluster, the process 270 presents a single average MV for the entire cluster (e.g., a local motion vector (LMV) 206). The single average MV generated by the process 270 is presented to an input of the process 272.

When all of the LMVs for each chosen location (e.g., search window) in the picture are obtained, the multiple LMVs may be presented to the input of the process 262 and the process 260 may be performed on the LMVs to generate a global motion vector (GMV) 210 (e.g., a recursive step). The LMVs and GMVs generated by the process 260 may be generated with sub-pel accuracy, even when the input motion vectors presented to the process 262 have only full-pel accuracy. In a preferred embodiment, only full-pel accurate motion vectors are used for generation of LMVs and GMVs in order to reduce computational demands. In general, both local and rough motion vectors may be sub-pel or full-pel accurate, depending upon the design criteria of a particular implementation. The best choice for quality is sub-pel accuracy, because sub-pel accuracy means the reach of the motion vector is between pixels, and therefore more accurate. The best choice for power utilization/processing time is full-pel accuracy, because there are fewer samples to process.

Figure 13:
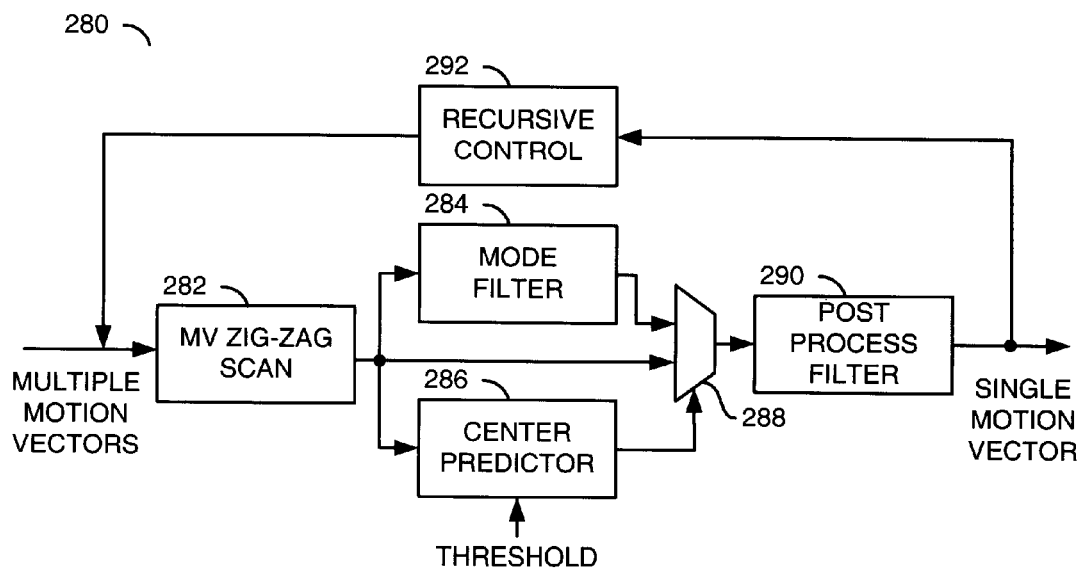
FIG. 13 is a block diagram illustrating a process in accordance with yet another embodiment of the present invention for generating a local motion vector.

Referring to FIG. 13, a block diagram is shown illustrating a process (or circuit) 280 in accordance with a preferred embodiment of the present invention. The process 280 may be implemented to generate a single motion vector based on multiple motion vectors. In one example, the process 280 may be used to generate a local motion vector (LMV) 206 from a plurality of motion vectors 204a-204n. In another example, the process 280 may be used to generate a global motion vector (GMV) 210 from a plurality of local motion vectors 206a-206n.

The process 280 may comprise a process (or circuit) 282, a process (or circuit) 284, a process (or circuit) 286, a process (or circuit) 288, a process (or circuit) 290 and a process (or circuit) 292. The process 282 may be implemented as a motion vector scanning process. The process 282 may arrange multiple motion vectors by performing a serialization scan (e.g., zig-zag, reversible, spiral, etc.). The process 284 may be implemented as a filter process. In one example, the process 284 may be implemented as a mode filter. The process 286 may be implemented as a center predictor process. The process 288 may be implemented as a multiplexing process. The process 290 may be implemented as a post process filter process. The process 290 generally converts a cluster of motion vectors into a single motion vector. In one example, the conversion may include a linear combination of the motion vectors. In a preferred embodiment, the linear combination may be implemented as an averaging operation of the motion vectors. The process 292 may be implemented as a recursive control process.

The process 282 may receive multiple motion vectors of full-pel or greater (e.g., sub-pel such as half-pel, quarter-pel, eighth-pel, etc.) accuracy. The process 282 may present the motion vectors to an input of the process 284, a first input of the process 286 and a first input of the process 288 in an order that reduces entropy between the multiple motion vectors. The process 284 performs a mode filtering operation on the ordered MVs and presents the result to a second input of the process 288. In a preferred embodiment the process 284 uses a mode filter.

The mode filter operation may be performed based upon the magnitudes of the motion vectors corresponding to an N×N grid of macroblocks in the search area. The most frequently occurring motion vector is chosen as the cluster's local motion vector. In one example, the most frequently occurring motion vectors may be chosen for each direction (horizontal and vertical) independently. In another example, the most frequently occurring motion vector for the combined horizontal and vertical directions may be chosen. If there are two vectors whose frequency of occurrence is the same, the cluster's representative vector may be the average of the two most frequent vectors, independently in each direction. The mode operation generally performs better. For example, the resulting GMV derived may be closer to the actual global picture displacement (GPD) and, therefore, produces the most effective digitally stabilized pictures. The mode option is generally the least computationally demanding alternative. In one example, a 4×4 may be implemented.

The process 286 receives a threshold value (e.g., THRESHOLD) at a second input and generates a control signal in response to the ordered MVs and the threshold value THRESHOLD. The process 286 presents the control signal to a control input of the process 288. The process 288 selects either the output from the process 284 or the ordered MVs from the process 282 for presentation to an input of the process 290 in response to the control signal received from the process 286.

The process 290 performs a post process filtering operation on the output of the process 288. In one example, the post process filtering operation may comprise performing an averaging filter on the MVs received from the process 288. In one example, the average filter may be performed independently for horizontal and vertical components. In another example, the post process filtering operation may be implemented as a median filter or ordered filter. When the multiple motion vectors received by the process 282 comprise motion vectors for a cluster, the process 290 presents a single average MV for the entire cluster (e.g., a local motion vector (LMV) 206). The single average MV generated by the process 290 is presented to an input of the process 292.

When all of the LMVs for each chosen location (e.g., search window) in the picture are obtained, the multiple LMVs may be presented to the input of the process 282 and the process 280 may be performed on the LMVs to generate a global motion vector (GMV) 210 (e.g., a recursive step). The LMVs and GMVs generated by the process 280 may be generated with sub-pel accuracy, even when the input motion vectors presented to the process 282 have only full-pel accuracy. In a preferred embodiment, only full-pel accurate motion vectors are used for generation of LMVs and GMVs in order to reduce computational demands. In general, both local and rough motion vectors may be sub-pel or full-pel accurate, depending upon the design criteria of a particular implementation. The best choice for quality is sub-pel accuracy, because sub-pel accuracy means the reach of the motion vector is between pixels, and therefore more accurate. The best choice for power utilization/processing time is full-pel accuracy, because there are fewer samples to process.

Figure 14:
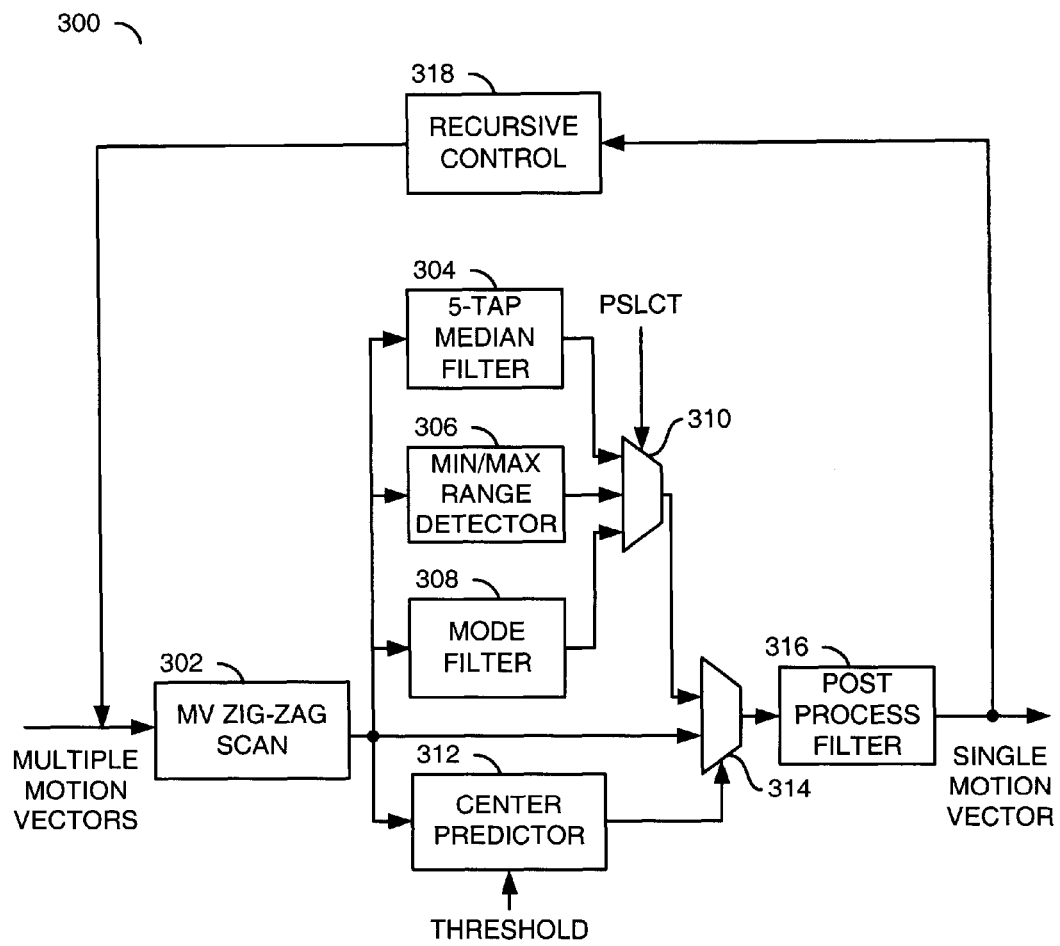
FIG. 14 is a block diagram illustrating a process in accordance with still another embodiment of the present invention for generating a local motion vector.

Referring to FIG. 14, a block diagram is shown illustrating a process (or circuit) 300 in accordance with a preferred embodiment of the present invention. The process 300 may be implemented to generate a single motion vector based on multiple motion vectors. In one example, the process 300 may be used to generate a local motion vector (LMV) 206 from a plurality of motion vectors 204a-204n. In another example, the process 300 may be used to generate a global motion vector (GMV) 210 from a plurality of local motion vectors 206a-206n.

The process 300 may comprise a process (or circuit) 302, a process (or circuit) 304, a process (or circuit) 306, a process (or circuit) 308, a process (or circuit) 310, a process (or circuit) 312, a process (or circuit) 314, a process (or circuit) 316 and a process (or circuit) 318. The process 302 may be implemented as a motion vector scanning process. The process 302 may arrange multiple motion vectors by performing a serialization scan (e.g., zig-zag, reversible, spiral, etc.). The process 304 may be implemented as a median filter process.

In one example, the process 304 may be implemented as either a 3-tap or a 5-tap median filter. The process 306 may be implemented as a range detection process. In one example, the process 306 may be implemented as a minimum/maximum range detection process. The process 308 may be implemented as a filter process. In one example, the process 308 may be implemented as a mode filter. The process 310 may be implemented as a selection (or multiplexing) process. The process 310 may be configured to select an output of one of the processes 304, 306 and 308 for presentation in response to a control signal (e.g., PSLCT). The process 312 may be implemented as a center predictor process. The process 314 may be implemented as a selection (or multiplexing) process. The processes 310 and 314, implemented together or separately, generally form a multiplexing module configured to select between (i) the motion vectors arranged in the predetermined order and (ii) the outputs of the processes 304, 306 and 308 in response to the output of the process 312 and the signal PSLCT. The process 316 may be implemented as a post process filter process.

The signal PSLCT may be provided, in one example, externally to the process 300. In one example, the signal PSLCT may be generated based upon a variance of the cluster of motion vectors. For example, when the variance of the cluster of motion vectors is below a predetermined threshold, the signal PSLCT may be generated with a state configured to select the mode filter process 308. In another example, the global vector of one or more previous frames may be used to determine the operation selected. In general, the selection between the processes 304, 306 and 308 may be performed either independently or in combination for the vertical and horizontal components of the motion vectors.

The process 316 generally converts a cluster of motion vectors into a single motion vector. In one example, the conversion may include a linear combination of the motion vectors. In a preferred embodiment, the linear combination may be implemented as an averaging operation of the motion vectors. The process 318 may be implemented as a recursive control process. In general, the process 300 combines the operations of the processes 240, 260 and 280 (described above in connection with FIGS. 11-13).

In one example, the processes 240, 260, 280 and 300 may be used to process horizontal and vertical motion vectors independently. However, a combination of horizontal and vertical motion vectors may also be processed using the processes 240, 260, 280 and 300. When the process 300 is implemented, independently processing horizontal and vertical motion vectors may include using different methods (e.g., median filtering, range detection, mode filtering, etc.) for each direction. In one example, the appropriate method may be determined based upon global motion detected in the horizontal and vertical directions independently. In general, the mode based method provides the best performance in eliminating outliers. However, if there is a strong vertical pan, median filtering may provide better results. The range detection method also works well, however the implementation cost in firmware may be higher than the mode based method. For the mode based method, a 4×4 macroblock grid may provide a good compromise in terms of processing and performance as compared to 3×3 and 5×5 grids of macroblocks. For the median filtering method grids of 3×3 and 5×5 macroblocks with 3-tap and 5-tap filters may be implemented.

As used herein, full-pel generally means non-fractional-pel. For example, in a design with full-pel accurate motion vectors, four motion vectors may be implemented as mv0, mv1, mv2, mv3. In a design with sub-pel (or fractional-pel) accurate motion vectors, for example quarter-pel, instead of having four vectors as listed above, thirteen vectors would be implemented (e.g., mv0.0, m0.25, mv0.50, mv0.75, mv1.0, mv1.25, mv1.50, . . . , mv2.75, mv3.0).

Although the input motion vectors to the stabilization processes 240, 260, 280 and 300 (e.g., the local MVs and rough MVs) may have only full-pel accuracy, the output of the processes 240, 260, 280 and 300 (e.g. the LMVs or GMVs) which are computed from the local MVs and rough MVs (e.g., as a linear combination of the local MVs and rough MVs), generally have sub-pel accuracy, regardless of the accuracy of the input motion vectors.

Figure 15:
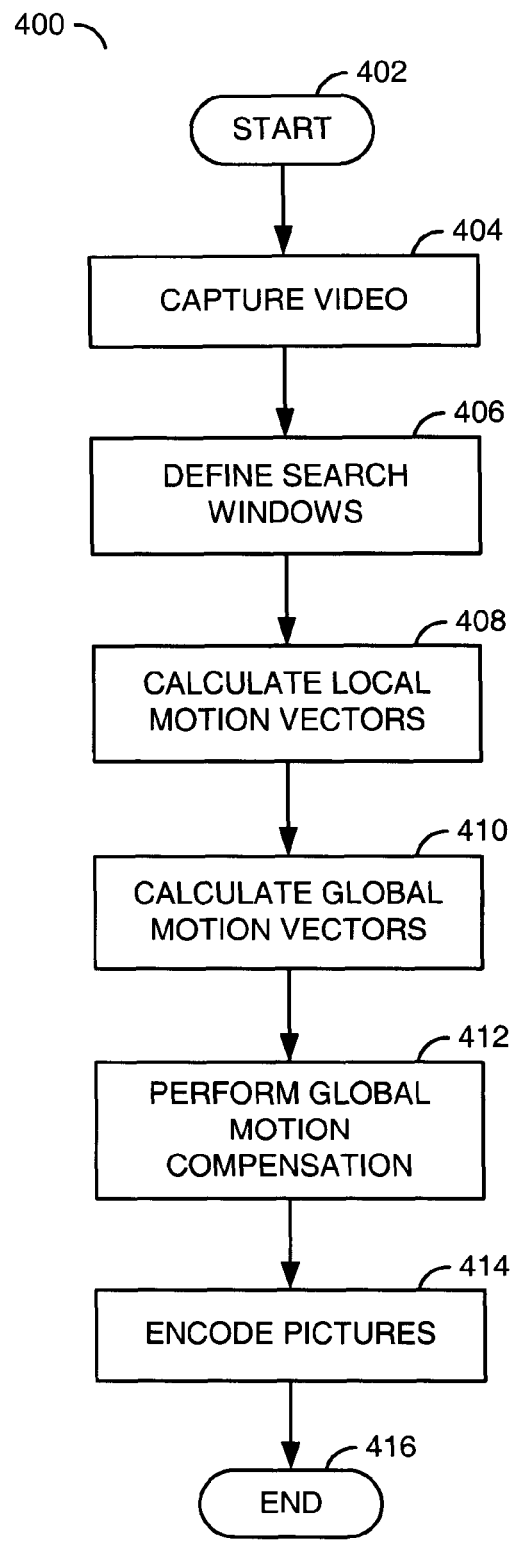
FIG. 15 is a flow diagram illustrating an operation in accordance with the present invention.

Referring to FIG. 15, a flow diagram of a method (or process) 400 in accordance with the present invention is shown. The process 400 generally comprises a state 402, a process 404, a process 406, a process 408, a process 410, a process 412, a process 414 and a state 416. The state 402 may be a start state. The state 416 may be an end state. The process 404 may capture video from the input signal P. The process 404 generally generates a series of sequential frames (or pictures) 200a-200n. Each of the frames 200a-200n may be individually encoded and/or processed. The process 406 defines the search windows 202a-202n. In general, the search windows 202a-202n are defined in each of the frames 200a-200n. The process 408 generally determines the clusters of motion vectors 204a-204n and performs the calculation of the local motion vectors 206a-206n. The process 410 generally generates the global motion vectors 210a-210n in response to the local motion vectors 206a-206n in each of the pictures 200a-200n. For example, a number of local motion vectors 206a-206n for the picture 200a may be used to generate the global motion vector 210a. Another set of local motion vectors 206a-206n for the picture 200b may be used to generate the global motion vector 210b. The process 412 may perform global motion compensation. For example, the process 412 may use the global motion vectors 210a-210n to perform motion compensation (MC) on the frames 200a-200n. The process 414 may encode the pictures 200a-200n into a compressed bitstream.

The global motion vectors 210a-210n may be used to modify (adjust) the particular encoding process (e.g., H.264 or other) implemented. While the method 400 provides a modification to the encoding process, the signal BITSTREAM is generally generated as a compliant bitstream that may be decoded by any compliant decoder (e.g., an H.264 or other decoder).

If the local cluster of blocks chosen to generate the motion vectors is positioned in a flat area of the picture (e.g., an area where there is very little detail) and there is little real motion in the area, the calculation of local motion vectors may produce motion vectors that are not reliable. For example, the difference between the block under processing and the reference block may be very small when an area where there is very little detail and/or little real motion and therefore any block will produce an acceptably low error, which is not indicative of motion.

To ensure reliable motion vectors are generated, image statistics may be obtained from the video preprocessor block 150. The image statistics may include spatial low and high frequency as well as edge information. Given a bandwidth threshold of 0.5 Nyquist, a block that has frequency information below the threshold may be classified as 'low frequency' and a block that has information above the threshold may be classified as 'high frequency'. The average value of all the pixels in the block below and above the bandwidth threshold represents the amount of such feature in the block. Similarly, the output of an edge detector performed on the pixels in the block may be averaged over all the pixels in the block, and the result used as an indication of edge energy in the block.

In one example, a location for the cluster of blocks may be chosen that has more than 10% high frequency, less than 50% of low frequency and strong edges (e.g., more than 5%). If an area of the picture meets the above criteria, the area may be chosen as a possible candidate for clustering. Once all blocks in the picture are examined, the actual areas may be chosen. The decision may be based on system limitations, but experience has shown that nine clusters are sufficient for good results.

In general, an encoder may be made more efficient by receiving a stabilized sequence of pictures. The increased efficiency may be translated into lower power (e.g., fewer computations performed) since the motion estimation range may be lowered for a stabilized picture. The increased efficiency may also be translated into smaller bitstreams since a stabilized sequence may be easier to encode. For example, the stabilized sequence may produce smaller compressed sizes compared to those produced by unstable (shaking or jittery) sequences, while preserving a high level of visual quality. In general, more bits would be used to maintain a high level of visual quality in an unstable sequence than would be used in a sequence stabilized in accordance with the present invention.

Traditional camcorder and DSC companies are likely to include DIS as part of their sensor and image processing pipeline, which are normally not adept at motion estimation processing. Conventional solutions are replete with shortcuts and compromises for the critical global motion estimation process. The system 100 takes advantage of the sophisticated mechanisms for motion estimation in hybrid entropy codecs, and statistical data gathered at various stages of the process for quality refinements. The system 100 may also decouple the global estimation (e.g., rough search) from the refined motion estimation thereby allowing flexible parallel reuse of each module.

The present invention may be used to minimize the cost of image stabilization in an integrated image stabilization processor/video encoder solution by re-using motion estimation designed for video encoding to achieve digital image stabilization. The present invention may be used to provide an effective image stabilization system as part of the normal video coding pipeline that may reduce costs by reusing and repurposing parts of the processing chain.

The present invention may be used in products that may straddle the boundary of image stabilization and video coding. The present invention, by virtue of system on a chip (SOC) integration, may be used in products that integrate image stabilization. The present invention may be used to allow us to a flexible and/or scalable solution for current and future products.

When looking for the best match for a block in the current picture, the proper selection of the starting search position in a reference picture is important to the success of a practical motion estimation process. In order to make a proper selection, a premotion estimator may be implemented to make a rough estimate of the starting position from which to perform a refined motion estimation. The rough estimation may be done in a multiple-pixel domain to obtain an estimate of where to start a refinement. The refined estimation may be made with sub-pel match accuracy and therefore require large amounts of computation. Although it is possible to use only the refined motion estimation, it is more efficient to perform a hierarchical search with a premotion estimator first.

The present invention may be implemented to essentially repurpose the resulting vectors from the premotion estimator to perform image stabilization. When the premotion estimator is configured so that the resulting rough motion vectors favor the co-located block position and are performed so that the cost from distortion is more important than the cost of coding the motion vector, the resulting vector may be used as a facsimile of true motion.

A premotion estimator module for performing rough estimation may be programmed according to the teaching of the present invention to produce localized motion vectors. A control layer may be implemented (e.g., in software, firmware, etc.) to process a plurality of localized premotion estimation vectors to produce a single global motion vector (GMV) for the picture. A plurality of GMVs for a video sequence of pictures may be further processed in accordance with the present invention to produce a stabilization displacement for every picture in the video sequence.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
a first circuit configured to generate (i) a first series of sequential frames, (ii) a plurality of local motion vectors for each of said frames, (iii) one or more global motion vectors for each of said frames, (iv) a second series of stabilized sequential frames, (v) a plurality of rough motion vectors and (vi) a digital bitstream in response to (i) a video input signal wherein each local motion vector for each of said frames is associated with a search window, and the location, number and size of search windows for each frame are determined according to a video stabilization process;
a second circuit configured to generate a single motion vector in response to a plurality of motion vectors, wherein said second circuit is further configured to eliminate outlier vectors from said plurality of motion vectors such that each global motion vector for each of said frames is derived based on the plurality of local motion vectors among which the outlier vectors are eliminated by the second circuit, and
wherein said series of stabilized sequential frames is motion compensated from the first series of sequential frames according to a sequence of said global motion vectors that are associated with the first series of sequential frames, and each global motion vector is temporally adjusted according to the sequence of said global vectors for the video stabilization process;
wherein said second circuit comprises one or more modules selected from the group consisting of a median filter, a mode filter and a range detector.

2. The apparatus according to claim 1, wherein said median filter comprises a filter selected from the group consisting of a 3-tap median filter and a 5-tap median filter.

3. The apparatus according to claim 1, wherein said range detector comprises a minimum/maximum range detector.

4. The apparatus according to claim 1, wherein said range detector is configured to eliminate motion vectors having values below a first predetermined threshold value or above a second predetermined threshold value.

5. The apparatus according to claim 4, wherein said range detector is configured to eliminate motion vectors having values below a 20th percentile of said plurality of motion vectors or above an 80th percentile of said plurality of motion vectors.

6. The apparatus according to claim 1, wherein said apparatus is configured to process horizontal motion vectors and vertical motion vectors independently.

7. The apparatus according to claim 1, wherein said second circuit comprises a median filter module, a mode filter module and a range detector module, and said second circuit is configured to select between said modules based upon global motion.

8. The apparatus according to claim 1, wherein said second circuit comprises a median filter module, a mode filter module and a range detector module, and said second circuit is configured to select between said modules based upon global motion detected in the horizontal and vertical directions independently.

9. The apparatus according to claim 8, wherein said second circuit is further configured to select the same module for both horizontal and vertical directions.

10. The apparatus according to claim 8, wherein said second circuit is further configured to select a different module for each direction.

11. The apparatus according to claim 8, wherein said second circuit is further configured to select either the same module for both horizontal and vertical directions or different modules for each direction.

12. The apparatus according to the claim 1, wherein said first circuit comprises:
a video preprocessor configured to generate (i) said first series of sequential frames, (ii) said second series of stabilized sequential frames, (iii) statistics for said first series of sequential frames and (iv) statistics for said second series of stabilized sequential frames.

13. The apparatus according to the claim 12, wherein said first circuit further comprises:
a pre-motion estimator configured to generate (i) said plurality of local motion vectors and (ii) said plurality of rough motion vectors in response to one or more search window parameters and a control signal.

14. The apparatus according to claim 13, wherein said first circuit further comprises:
an encoder circuit configured to generate said digital bitstream in response to said second series of stabilized sequential frames.

15. The apparatus according to claim 1, wherein said second circuit comprises:
a scan module configured to arrange said plurality of motion vectors according to a predetermined order;
a center predictor module configured to generate a first control signal in response to (i) said motion vectors arranged in said predetermined order and (ii) a threshold value;
a multiplexing module configured to select between (i) said motion vectors arranged in said predetermined order and (ii) an output of one or more filter modules in response to said first control signal and a second control signal;
a post process filter configured to generate said single motion vector in response to an output of said multiplexing module; and
a recursive control module configured to perform a recursive operation with motion vectors generated by said post process filter module.

16. The apparatus of claim 1, wherein the global motion vectors represent motion separate from motion introduced into a frame by jitter.

17. The apparatus of claim 1, wherein the local motion vectors are determined within search windows of one frame of image data, and global motion vectors are obtained within respective frames from the local motion vectors of said one frame.

18. A method for stabilizing an image comprising the steps of: (A) capturing an uncompressed video signal to generate a first series of sequential frames;
  (B) defining a plurality of search windows in each of the frames the location, number and size of search windows for each frame are determined according to a video stabilization process;
  (C) calculating a local motion vector for each of the search windows in each of the frames in response to a plurality of individual motion vectors within each of the frames;
  (D) calculating a global motion vector for each of the frames based on each of the local motion vectors in each of the frames using a process configured to eliminate outlier vectors; and
  (E) generating a second series of sequential frames, wherein said series of stabilized sequential frames is motion compensated from the first series of sequential frames according to a sequence of said global motion vectors that are associated with the first series of sequential frames, and each global motion vector is temporally adjusted according to the sequence of said global vectors for the video stabilization process;
  wherein said outlier vectors are eliminated using one or more processes selected, in response to a control signal, from the group consisting of median filtering, range detection, and mode filtering.

19. An apparatus for stabilizing an image comprising:
  means for capturing an uncompressed video signal to generate a first series of sequential frames;
  means for defining a plurality of search windows in each of the frames, the location, number and size of search windows for each frame are determined according to a video stabilization process;
  means for calculating a local motion vector for each of the search windows in each of the frames in response to a plurality of individual motion vectors within each of the frames;
  means for calculating a global motion vector for each of the frames based on each of the local motion vectors in each of the frames using a process configured to eliminate outlier vectors; and
  means for generating a second series of sequential frames, wherein
  said series of stabilized sequential frames is motion compensated from the first series of sequential frames according to a sequence of said global motion vectors that are associated with the first series of sequential frames, and each global motion vector is temporally adjusted according to the sequence of said global vectors for the video stabilization process;
  wherein said process for eliminating outlier vectors comprises one or more processes selected, in response to a control signal, from the group consisting of median filtering, range detection, and mode filtering.

* * * * *